United States Patent
Macdonald et al.

(10) Patent No.: US 11,235,418 B2
(45) Date of Patent: Feb. 1, 2022

(54) ALUMINUM TO STEEL BRAZE RESISTANCE SPOT WELDING

(71) Applicants: John Macdonald, White Lake, MI (US); Michael L Shaw, Clarkston, MI (US); Doan R Whitt, White Lake, MI (US); William H Trojanowski, Grosse Pointe Farms, MI (US)

(72) Inventors: John Macdonald, White Lake, MI (US); Michael L Shaw, Clarkston, MI (US); Doan R Whitt, White Lake, MI (US); William H Trojanowski, Grosse Pointe Farms, MI (US)

(73) Assignee: FCA US LLC, Auburn Hills, MI (US)

( * ) Notice: Subject to any disclaimer, the term of this patent is extended or adjusted under 35 U.S.C. 154(b) by 328 days.

(21) Appl. No.: 16/167,956

(22) Filed: Oct. 23, 2018

(65) Prior Publication Data
US 2019/0134737 A1    May 9, 2019

Related U.S. Application Data

(60) Provisional application No. 62/581,975, filed on Nov. 6, 2017.

(51) Int. Cl.
*B23K 11/20* (2006.01)
*B23K 1/20* (2006.01)
(Continued)

(52) U.S. Cl.
CPC .............. *B23K 11/20* (2013.01); *B23K 1/203* (2013.01); *B23K 11/115* (2013.01); *B23K 11/24* (2013.01);
(Continued)

(58) Field of Classification Search
CPC ....... B23K 11/20; B23K 11/115; B23K 11/24; B23K 11/34; B23K 11/11; B23K 1/203;
(Continued)

(56) References Cited

U.S. PATENT DOCUMENTS 5,961,853 A * 10/1999 Thornton ............. B23K 1/0004
219/85.14
2009/0233118 A1* 9/2009 Katoh .................. B23K 35/404
428/553

(Continued)

FOREIGN PATENT DOCUMENTS

CN 102380678 3/2012
JP 2014237145 A * 12/2014

*Primary Examiner* — Tu B Hoang
*Assistant Examiner* — Alba T Rosario-Aponte
(74) *Attorney, Agent, or Firm* — Ralph E. Smith

(57) ABSTRACT

A system and method of braze resistance spot welding of an aluminum component to a galvanized steel component involve providing an aluminum-side electrode having a first tip defining a rounded shape, providing a galvanized steel-side electrode having a second tip defining a flat shape, depositing a braze filler material between the aluminum and galvanized steel components at a desired location for a spot weld, performing a pre-heat including providing a first current across the electrodes for a first period such that the braze filler melts and removes a portion of a zinc coating from the galvanized steel component, and after performing the pre-heat, performing a spot weld between the aluminum and galvanized steel components by providing a second current across the electrodes for a second period such that the aluminum melts and the galvanized steel does not melt, wherein the second current is greater than the first current.

14 Claims, 3 Drawing Sheets

(51) Int. Cl.
  *B23K 11/11*  (2006.01)
  *B23K 35/362*  (2006.01)
  *B23K 11/34*  (2006.01)
  *B23K 35/00*  (2006.01)
  *B23K 35/36*  (2006.01)
  *B23K 11/24*  (2006.01)

(52) U.S. Cl.
  CPC ............ *B23K 11/34* (2013.01); *B23K 35/002* (2013.01); *B23K 35/3601* (2013.01); *B23K 35/362* (2013.01)

(58) Field of Classification Search
  CPC . B23K 35/002; B23K 35/3601; B23K 35/362
  USPC ..................................... 219/91.2, 86.1, 78.01
  See application file for complete search history.

(56) References Cited

U.S. PATENT DOCUMENTS

| | | | |
|---|---|---|---|
| 2015/0231723 A1 | 8/2015 | Yang et al. | |
| 2016/0008912 A1* | 1/2016 | Schroth | B23K 11/34 |
| | | | 219/118 |
| 2017/0291246 A1* | 10/2017 | Sigler | B23K 11/20 |
| 2017/0297134 A1* | 10/2017 | Sigler | B23K 11/34 |
| 2017/0297137 A1* | 10/2017 | Perry | B23K 35/302 |

* cited by examiner

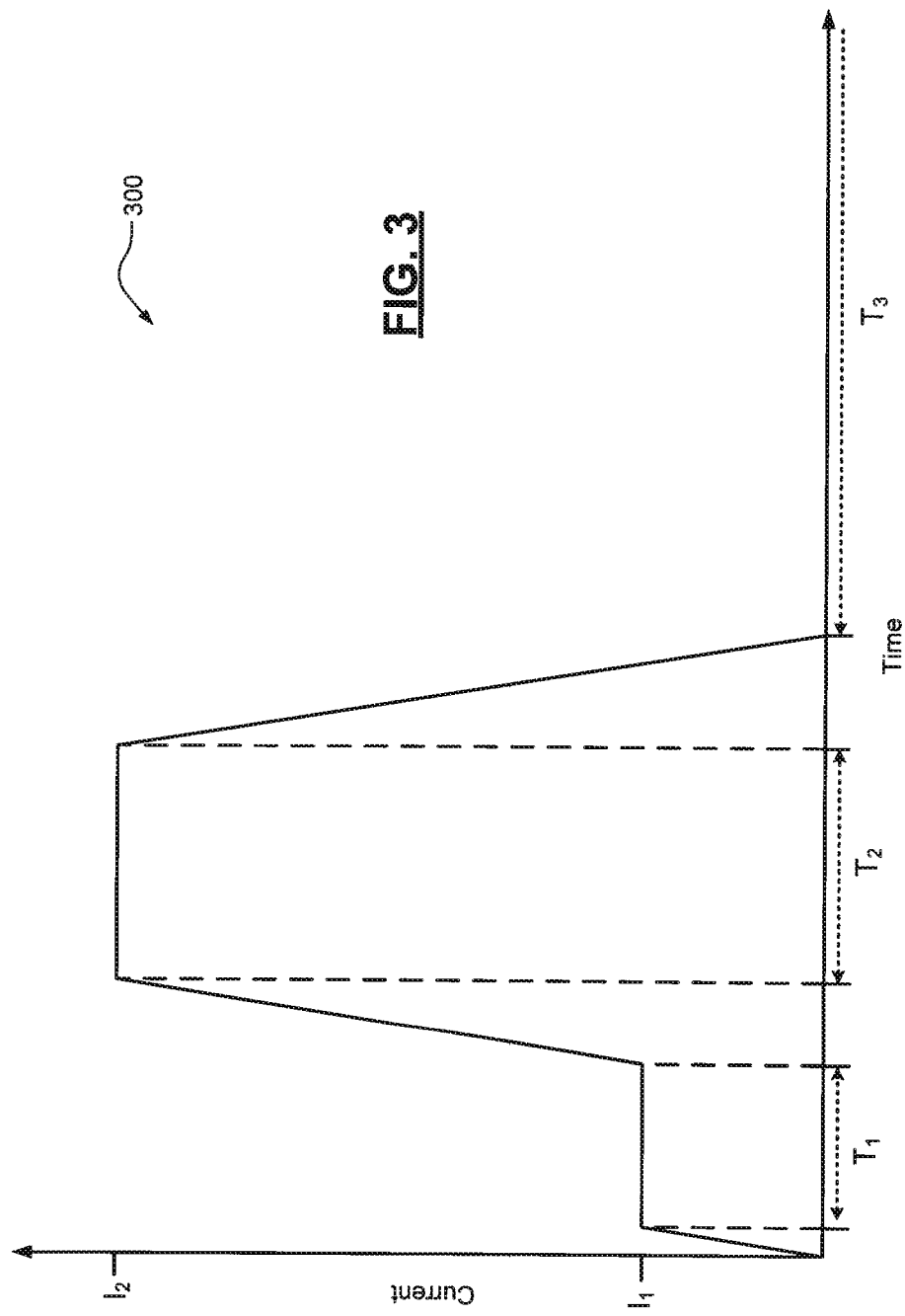

ALUMINUM TO STEEL BRAZE RESISTANCE SPOT WELDING

CROSS-REFERENCE TO RELATED APPLICATION(S)

The present application claims the benefit of U.S. Provisional Application No. 62/581,975, filed on Nov. 6, 2017. The disclosure of this application is incorporated herein by reference in its entirety.

FIELD

The present application generally relates to joining dissimilar metals and, more particularly, to a process for aluminum to steel braze resistance spot welding.

BACKGROUND

Automobiles often include components made of steel and components made of aluminum. Resistance spot welding is a technique that is often utilized to join steel to steel and aluminum to aluminum. While steel is stronger than aluminum, steel is also much heavier than aluminum. One goal in designing a vehicle is to decrease vehicle weight while also meeting strength and safety requirements. Therefore, there is a need to join aluminum and steel components. Conventional resistance spot welding, however, does not work well for joining aluminum to steel. This is because steel has a very high resistance compared to aluminum, which results in the steel melting and the formation of brittle intermetallic compounds that may weaken the weld. One alternative to welding is to utilize physical fasteners to join the steel and the aluminum, such as mechanical rivets. These physical fasteners, however, increase costs. Accordingly, while resistance spot welding works well for aluminum to aluminum and steel to steel welds, and while physical fasteners work well for joining aluminum and steel, there remains a need for improvement in the relevant art.

SUMMARY

According to one example aspect of the invention, a system for braze resistance spot welding of an aluminum component of an automobile to a galvanized steel component of the automobile is presented. In one exemplary implementation, the system comprises: an aluminum-side electrode having a first tip defining a rounded shape, a galvanized steel-side electrode having a second tip defining a flat shape, and a control system configured to: deposit a braze filler material between the aluminum and galvanized steel components at a desired location for a spot weld, perform a pre-heat including providing a first current across the electrodes for a first period such that the braze filler melts and removes a portion of a zinc coating from the galvanized steel component, and after performing the pre-heat, performing a spot weld between the aluminum and galvanized steel components by providing a second current across the electrodes for a second period such that the aluminum melts and the galvanized steel does not melt, wherein the second current is greater than the first current.

In some implementations, the first current is approximately 4 kiloamps and the first period is approximately 10 milliseconds. In some implementations, the second current is approximately 19 kiloamps and the second period is approximately 17 milliseconds.

In some implementations, the braze filler material is a braze paste comprising an aluminum-silicon alloy powder. In some implementations, the braze paste further comprises a flux including a potassium-aluminum-fluorine compound, a cesium-aluminum-fluorine compound, and a binder In some implementations, the rounded and flat shapes defined by the first and second tips are designed to focus the current density in the aluminum component. In some implementations, the flat shape of the second tip is fully flat such that a face of the second tip is parallel to a surface of the galvanized steel component.

In some implementations, the spot weld meets automobile body in white (BIW) requirements.

According to another example aspect of the invention, a method of braze resistance spot welding of an aluminum component of an automobile to a galvanized steel component of the automobile is presented. In one exemplary implementation, the method comprises: providing an aluminum-side electrode having a first tip defining a rounded shape, providing a galvanized steel-side electrode having a second tip defining a flat shape, depositing a braze filler material between the aluminum and galvanized steel components at a desired location for a spot weld, performing a pre-heat including providing a first current across the electrodes for a first period such that the braze filler melts and removes a portion of a zinc coating from the galvanized steel component, and after performing the pre-heat, performing a spot weld between the aluminum and galvanized steel components by providing a second current across the electrodes for a second period such that the aluminum melts and the galvanized steel does not melt, wherein the second current is greater than the first current.

In some implementations, the first current is approximately 4 kiloamps and the first period is approximately 10 milliseconds. In some implementations, the second current is approximately 19 kiloamps and the second period is approximately 17 milliseconds.

In some implementations, the braze filler material is a braze paste comprising an aluminum-silicon alloy powder. In some implementations, the braze paste further comprises a flux including a potassium-aluminum-fluorine compound, a cesium-aluminum-fluorine compound, and a binder In some implementations, the rounded and flat shapes defined by the first and second tips are designed to focus the current density in the aluminum component. In some implementations, the flat shape of the second tip is fully flat such that a face of the second tip is parallel to a surface of the galvanized steel component.

In some implementations, the spot weld meets automobile BIW requirements.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a plot of example current waveforms utilized during the braze resistance spot welding process according to the principles of the present disclosure.

Figure 1:
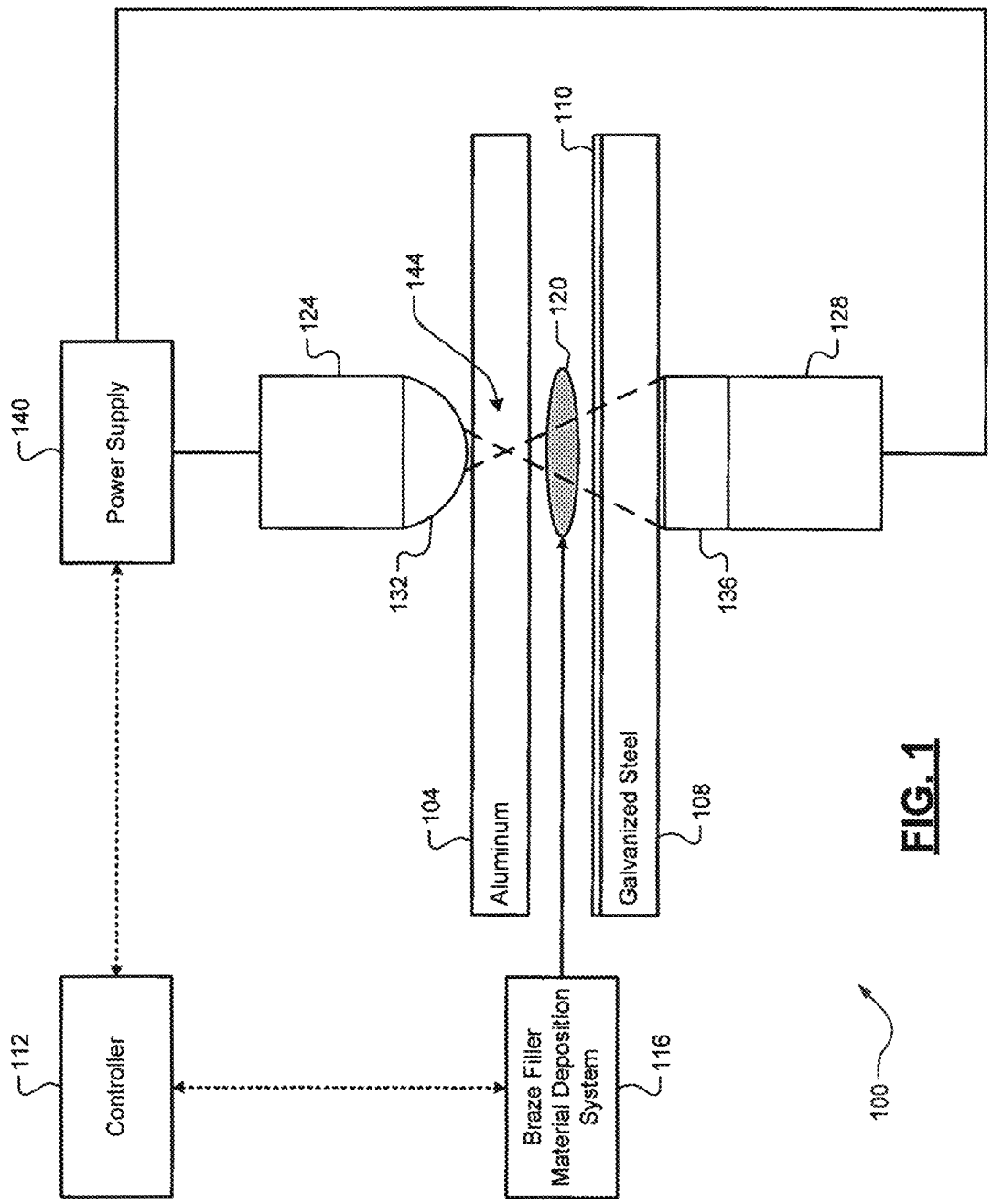
FIG. 1 is a diagram of an example braze resistance spot welding system for joining aluminum and steel according to the principles of the present disclosure.

Further areas of applicability of the teachings of the present disclosure will become apparent from the detailed description, claims and the drawings provided herein, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional resistance spot welding is inadequate for joining aluminum and steel. This is due to the formation of brittle intermetallic compounds that result in a weak weld, which does not meet automobile body in white (BIW) requirements. The alternative to welding is to utilize physical fasteners (e.g., mechanical rivets) to join aluminum and steel components. An average automobile, for example, could require hundreds or thousands of aluminum-steel joints. Physical fasteners, or other techniques (e.g., resistance spot welding in a vacuum environment), are thus not suitable for automobiles due to their associated costs. Accordingly, a new process for aluminum to steel braze resistance welding is presented. This process utilizes a system that applies a braze filler material between aluminum and steel components and provides two short current pulses to form the spot weld. The first current pulse has a lesser current and is designed to melt only the braze filler material, whereas the higher magnitude second current pulse melts only the aluminum component and not the steel component to form the spot weld. This is achieved using specific tip configurations for the two electrodes.

Referring now to FIG. 1, a diagram of an example braze resistance spot welding system 100 is illustrated. The system 100 is utilized to form a spot weld between an aluminum component 104 and a galvanized steel component 108 (e.g., having a zinc coating 110). One example of these components 104, 108 are body components of an automobile (e.g., aluminum sheet metal and steel frame), but it will be appreciated that this system 100 could be utilized to join any aluminum and steel components. The system 100 comprises a controller 112 that controls the braze resistance spot welding process. In one exemplary implementation, the controller 112 controls a braze filler material deposition system 116 to deposit a braze filler material 120 between the components 104, 108. While an automated deposition of the braze filler material is shown and described, it will be appreciated that the braze filler material 120 could be manually applied by a human operator.

In one exemplary implementation, the braze filler material 120 is a braze paste comprising an aluminum-silicon alloy powder. For example only, this alloy powder could comprise 88% aluminum and 12% silicon in a 45-177 micron particle size range. It will be appreciated that these ranges are only examples and that other suitable ranges and compositions could be utilized. In one exemplary implementation, the braze filler material 120 further comprises a flux. For example only, this flux could include a potassium-aluminum-fluoride compound (for aluminum oxide), a cesium-aluminum-fluorine compound (for magnesium oxide), and a binder. It will be appreciated that the composition of the braze filler material 120 could vary from the specific compositions described above. For example, the composition of the braze filler material 120 could be adjusted for a specific electrode and current waveform setup, which will now be described in greater detail.

The system 100 comprises an aluminum-side electrode 124 and a galvanized steel-side electrode 128 arranged on opposing sides of the components 104, 108. The aluminum-side electrode 124 has a tip 132 defining a rounded shape, whereas the steel-side electrode 128 has a tip 136 defining a flat shape (e.g., a planar face). These tips, for example, could be made of copper and are able to be machined and reused many times before being replaced. The tips 132, 136 deteriorate over time due to the large currents flowing across the electrodes 124, 128 for long periods of time. The flat shape of tip 136 is also very easy to machine and thus to maintain compared to uniquely shaped tips. A power supply 140 (e.g., a transformer) provides a specific current across the electrodes 124, 128, such as in response to a command from the controller 112. While not shown, it will be appreciated that the system 100 could further include a motor or servo system that applies compressive force to the components 104, 108 during the process.

As shown at 144, the shapes of the tips 132, 136 cause the current density to be focused in the aluminum component 104. This is desirable to prevent the steel component 108 from melting, which results in the formation of the brittle intermetallic compounds that cause a weak weld, as previously discussed herein. The controller 112 first performs a pre-heat by commanding the power supply 140 to provide a first current across the electrodes 124, 128 for a first period. This period is very short and this current pulse causes the braze filler material 120 to melt, but does not cause either of the components 104, 108 to melt. The melting of the braze filler material 120 also removes or strips the zinc coating 110 from the steel component 108, allowing for a stronger weld. The controller 112 thereafter performs the spot weld by commanding the power supply 140 to provide a larger second current across the electrodes 124, 128 for a second period. The specifics of this process will now be described in greater detail.

Figure 2:
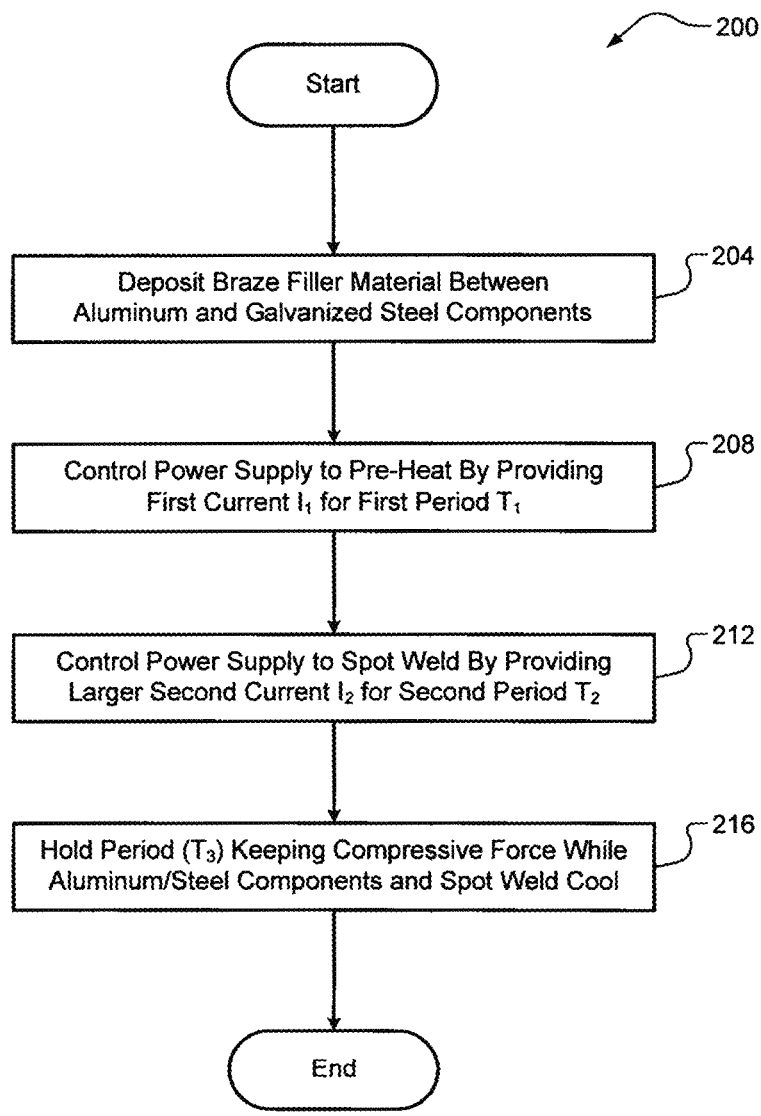
FIG. 2 is a flow diagram of an example method for braze resistance spot welding of aluminum and steel according to the principles of the present disclosure.

Referring now to FIGS. 2-3, a flow diagram of an example braze resistance spot welding method 200 for joining the aluminum and steel components 104, 108 and an example current waveform plot 300 (not to scale) are illustrated. At 204, the controller 112 commands the braze filler material deposition system 116 to deposit the braze filler material 120 between the components 104, 108. As previously discussed, a human could also manually deposit the braze filler material. At 208, the controller 112 performs a pre-heat by commanding the power supply 140 to provide a first current ($I_1$) across the electrodes 124, 128 for a first period ($T_1$). This pre-heat causes the braze filler material 120 to melt and remove/strip the zinc coating from the steel component 108, but without melting either the aluminum or steel components 104, 108. At 212, the controller 112 performs the spot weld by commanding the power supply 140 to provide a second current ($I_2$) across the electrodes 124, 128 for a second period ($T_2$). These periods $T_1$ and $T_2$ could not include the ramping up/down of the current (as shown in FIG. 3) or could alternatively include the ramping up/down of the current.

As shown, the second current $I_2$ is much greater than the first current $I_1$. Non-limiting exemplary values for the first and second currents $I_1$, $I_2$ are 4 kiloamps and 19 kiloamps, respectively. It will be appreciated, however, that the exact magnitudes of these currents could vary, such as due to changes to the periods $T_1$, $T_2$ and/or due to changes to the composition of the braze filler material 120. Compared to the first and second currents $I_1$, $I_2$, the first and second periods $T_1$, $T_2$ are more similar. Non-limiting exemplary values for the first and second periods $T_1$, $T_2$ are 10 milliseconds and 17 milliseconds, respectively. Again, it will be appreciated that the exact durations of these periods could vary, such as due to changes to the currents $I_1$, $I_2$ and/or due to changes to the composition of the braze filler material 120. A hold period (step 216, $T_3$) follows the second period $T_2$, during which no current is provided but the components 104, 108 are held together (e.g., via the compressive force from the motors/servos) while the components 104, 108 cool and the formation of the spot weld completes.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for braze resistance spot welding of an aluminum component of an automobile to a galvanized steel component of the automobile, the system comprising:
    an aluminum-side electrode having a first tip defining a contact surface with a rounded shape;
    a galvanized steel-side electrode having a second tip defining a contact surface with a flat shape; and
    a control system configured to:
        deposit a braze filler material between the aluminum and galvanized steel components at a desired location for a spot weld;
        perform a pre-heat including providing a first current across the electrodes for a first period such that the braze filler melts and removes a portion of a zinc coating from the galvanized steel component; and
        after performing the pre-heat, performing the spot weld between the aluminum and galvanized steel components by providing a second current across the electrodes for a second period such that the aluminum melts and the galvanized steel does not melt,
    wherein the second current is greater than the first current, and
    wherein the rounded and flat shapes defined by the first and second tips are configured to focus the current density in the aluminum component to facilitate preventing the galvanized steel component from melting.

2. The system of claim 1, wherein the first current is 4 kiloamps and the first period is 10 milliseconds.

3. The system of claim 1, wherein the second current is 19 kiloamps and the second period is 17 milliseconds.

4. The system of claim 1, wherein the braze filler material is a braze paste comprising an aluminum-silicon alloy powder.

5. The system of claim 4, wherein the braze paste further comprises a flux including a potassium-aluminum-fluorine compound, a cesium-aluminum-fluorine compound, and a binder.

6. The system of claim 1, wherein the galvanized steel-side electrode is rectangular with sharp corners and the second tip is fully flat such that a face of the second tip is parallel to a surface of the galvanized steel component.

7. The system of claim 1, wherein the entire contact surface of the first tip is rounded.

8. A method of braze resistance spot welding of an aluminum component of an automobile to a galvanized steel component of the automobile, the method comprising:
    providing an aluminum-side electrode having a first tip defining a contact surface with a rounded shape;
    providing a galvanized steel-side electrode having a second tip defining a contact surface with a flat shape; and
    providing a control system for:
        depositing a braze filler material between the aluminum and galvanized steel components at a desired location for a spot weld;
        performing a pre-heat including providing a first current across the electrodes for a first period such that the braze filler melts and removes a portion of a zinc coating from the galvanized steel component; and
        after performing the pre-heat, performing the spot weld between the aluminum and galvanized steel components by providing a second current across the electrodes for a second period such that the aluminum melts and the galvanized steel does not melt,
    wherein the second current is greater than the first current, and
    wherein the rounded and flat shapes defined by the first and second tips are configured to focus the current density in the aluminum component to facilitate preventing the galvanized steel component from melting.

9. The method of claim 8, wherein the first current is 4 kiloamps and the first period is 10 milliseconds.

10. The method of claim 8, wherein the second current is 19 kiloamps and the second period is 17 milliseconds.

11. The method of claim 8, wherein the braze filler material is a braze paste comprising an aluminum-silicon alloy powder.

12. The method of claim 11, wherein the braze paste further comprises a flux including a potassium-aluminum-fluorine compound, a cesium-aluminum-fluorine compound, and a binder.

13. The method of claim 8, wherein the flat shape of the second tip is fully flat such that a face of the second tip is parallel to a surface of the galvanized steel component.

14. The method of claim 8, wherein the spot weld meets automobile body in white (BIW) requirements.

* * * * *